Figure 7:
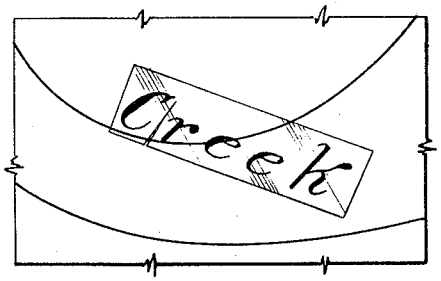

May 7, 1940. W. W. HEINTZ 2,200,203
LEGEND SHEET AND METHOD OF APPLICATION
Filed Dec. 16, 1938 2 Sheets-Sheet 1
Fig. 1.
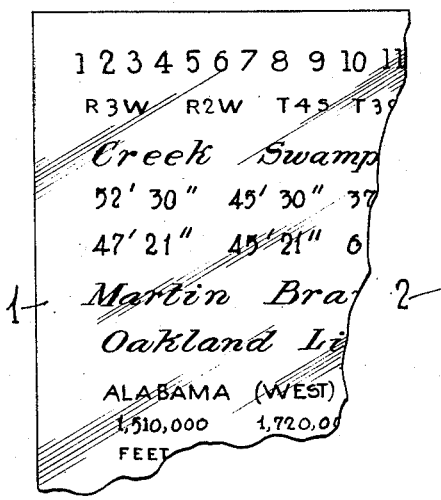
Fig. 2.
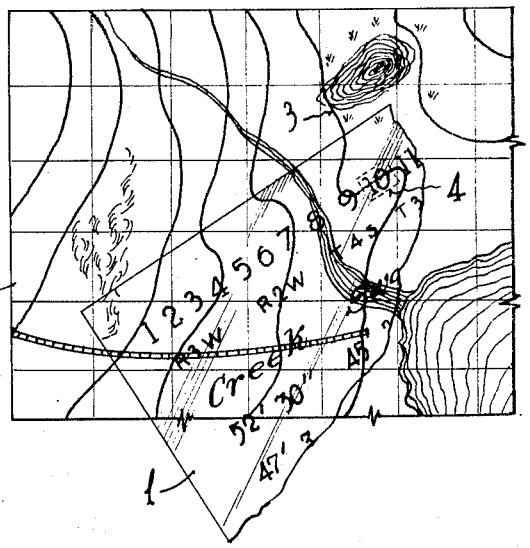
Fig. 3.
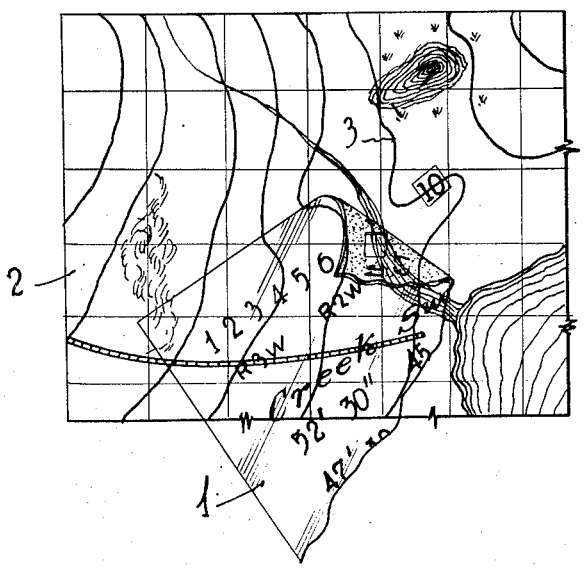
Fig. 5.
Fig. 6.
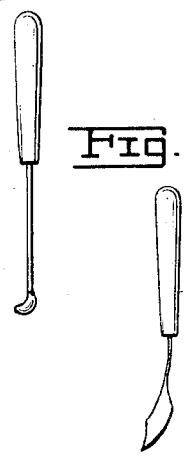
Fig. 4.
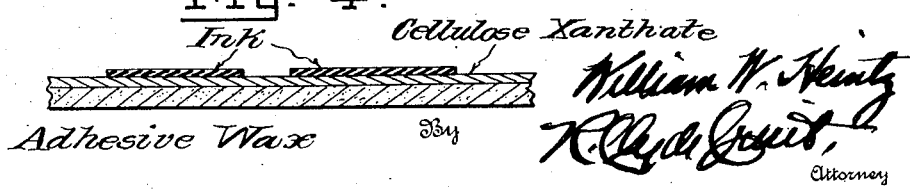
Inventor
William W. Heintz
By
Attorney May 7, 1940. W. W. HEINTZ 2,200,203
LEGEND SHEET AND METHOD OF APPLICATION
Filed Dec. 16, 1938 2 Sheets-Sheet 2

Patented May 7, 1940

2,200,203

UNITED STATES PATENT OFFICE 2,200,203

LEGEND SHEET AND METHOD OF APPLICATION

William W. Heintz, Aurora Hills, Va.

Application December 16, 1938, Serial No. 246,196

9 Claims. (Cl. 35—40)

This invention relates to a method for transposing a selected legend, from a legend sheet of novel construction, containing various legends or characters, to a master copy in the engraving art, the same being particularly applicable to the production of maps, charts and the like.

In prior methods, in preparing these master copies or original for photographing, in the case of a map for example, the map showing the towns, rivers, roads and contours is first printed or otherwise prepared and the various legends such as the names of the towns, rivers and contour numbers, are cut from an opaque adhesive sheet, having printed thereon the different legends to be used, and each cut-out is then glued to the master copy in its proper location. In doing this, where the cut-outs are very small, these tiny bits of paper are difficult to handle and properly place on the master copy. Moreover, being opaque these applied legends oftentimes cover up portions of the lines on the map or the like indicating the rivers and contours so that these lines have to be redrawn before photographing the original or master copy. It is desirable, in placing these legends on the master copy, to curve them to conform to and follow the curved lines indicating the roads, rivers and contours. This is almost impossible where the small individual legends are first cut from a sheet and pasted on the master copy owing to the difficulty in handling the same.

Furthermore these pasted-on legends require a moistening of the adhesive and when applied the edges thereof indicate sufficient thickness so as to throw a shadow when photographed, requiring a retouching of the negative. In addition, these prior methods are slow as well as inaccurate as compared to that disclosed hereinafter relative to the instant invention.

The object of the present invention is to overcome all of the above referred to disadvantages by providing a transparent printed sheet having applied to the back thereof a specially prepared wax adhesive that will cement itself in place upon the application of pressure.

Another object is the provision of a legend sheet of the character indicated, whereby the entire sheet may be placed over the master copy with the desired name or legend in proper place on the master copy, after which this name or legend is stuck to the master copy or original by a slight rubbing pressure and afterwards cut out and the sheet removed.

A further object is to provide a method of application of the various names or legends so that they may be curved to follow the lines on the master copy.

Another object is to provide a legend sheet that being transparent, will not, when applied, cover up or block out any of the lines on the master copy, making it ideal for use also on tracing cloth.

Another very important object of the invention is to greatly lessen the time and effort usually required in the application and use of legend sheets now available to the trade.

A still further object is the provision of a specially prepared adhesive wax for the legend sheet that will require only a slight pressure in its use.

Briefly stated the present invention involves a cellulose xanthate or viscose sheet having printed on one side thereof the various names, numbers or other legends to be used and on the reverse side there is applied a coating of adhesive wax, which, although not sticky to the touch, will cause the sheet or any portion thereof to adhere to any desired surface upon the application of pressure. In using the sheet, instead of cutting out the individual names and handling these small pieces of paper, as in present methods, it is possible to lay the entire sheet of lettering on the original or master copy to be lettered, with the name to be applied in its exact position, which can be readily done as the sheet is perfectly transparent. The operator then sticks the name to the original by rubbing over the particular name only, with a small burnisher. The name is then outlined with a sharp cutter and the sheet removed leaving the name properly secured in place and the balance of the sheet is ready for repeated use until all of the legends thereon have been exhausted.

The improved legend sheet and method of application is illustrated in the accompanying drawings in which, Figure 1 is a fragmentary view, or section of the novel transparent legend sheet forming a part of the present invention.

Figure 2 is a view illustrating the manner of using the improved sheet in connection with a master copy for reproducing a map, wherein said sheet is oriented to bring the selected legend or numeral in proper position with respect to a contour line. In this view for clearness in illustration the legends on the transparent sheet are shown somewhat enlarged with respect to the characters on the master copy, Figure 3 is a view similar to Figure 2, showing the manner of removing the legend sheet after the selected numeral, in this particular instance, has been affixed by pressure to the master copy and severed from the legend sheet, Figure 4 is a greatly enlarged fragmentary sectional view of the legend sheet showing the transparent foundation with a coating of adhesive wax on one side and the printed matter on the reverse side, Figures 5 and 6 are views illustrating the preferred forms of burnishing tool and cutter employed in carrying out the method involved, and Figures 7 to 11 inclusive are enlarged views illustrating, in the various successive steps, the manner of applying a legend to a curved line, such as a stream or creek, as shown for example in this particular instance.

Referring to the drawings in detail, 1 represents the improved legend sheet made of thin transparent material and preferably of cellulose xanthate. On the upper side of this sheet is printed or otherwise applied, the various legends to be used in the process at hand and on the reverse side there is provided a coating of adhesive wax of a special composition, said coating being applied by a tank and roller process or any other desired or preferred method or apparatus. The improved adhesive is not sticky to the touch, but will cause the sheet or any part thereof to adhere to any surface upon the application of pressure. This adhesive preferably consists of white refined beeswax having dissolved therein latex rubber. In applying the wax to the transparent sheet a certain temperature has to be maintained and in the preferred coating apparatus a centigrade thermometer and an adjustable electrical heating unit is employed.

In practice, the prepared wax adhesive is first melted and brought to the proper coating temperature, which is between 90° and 110° centigrade and then applied to the underside of the printed transparent sheet, it being desirable to provide the coating apparatus with a wiper blade to regulate the thickness of the wax coating. After coating, the sheets are piled, wax side down, with slip sheets of paper between each coated sheet, and the sheets are then ready for use.

Referring to Figure 2 the article or master copy for the purpose of this description is shown as a section of a map designated as 2, and as a simple illustration of the manner of using or applying the invention it will be assumed that it is desired to affix the numeral 10 to one of the contour lines 3, it of course to be understood that any other legend or character can be affixed to any other proper place on the master copy 2.

The first step is to orient the sheet 1 so that the numeral 10 will be in proper alignment with the contour line 3 and when so placed, with a small burnishing tool such as illustrated in Figure 5, that part of the sheet 1 containing the numeral 10 is pressed into engagement with the face of the master copy 2 by a slight rubbing action, which will cause that part of the sheet to adhere to said master copy. The next step is to cut around the numeral 10 as shown in dotted lines at 4, after which the remaining part of the sheet 1 is removed, leaving the numeral 10 in proper place on the contour line 3 as clearly illustrated in Figure 3.

In this manner the various legends, words or numerals can be accurately and quickly affixed to the master copy, without blocking out any of the lines or characters on the master copy, which can not be done with the opaque adhesive sheets used in the trade today.

Furthermore by being able to handle the whole sheet, instead of the small individual legends or numerals, as in the present day methods, there is a great saving of time and effort in affixing these separate and various words and numerals in their proper positions and oftentimes heretofore, they were not, in many instances, properly placed.

In addition, the transparency of the sheet allows absolute accuracy of location of the legends to be applied and permits the insertion of names in close places where it would have been impossible to paste a name printed on an opaque background. It also permits already drawn or printed lines on the master copy to appear between letters of the name where they would normally have to be broken or redrawn if an opaque paper sheet were used.

Further, the use of an adhesive which can be made to hold by means of pressure only, is also a great saver of time in preparing these master copies.

Also, in photographing the completed original or master copy for reproduction, this transparent legend sheet is so thin that the cut edges of the applied names and numerals, cast no shadows that require retouching of the negative as is the case with the usual pasted lettering.

The present invention is ideally suited for use in connection with tracing cloth from which blue prints or other contact prints are to be made. Heretofore all lettering on tracing cloth or tracing paper had to be done by hand or with a stamping machine, as pasted lettering on opaque material was obviously worthless and entirely unsuitable for this purpose.

In addition to all of the above outlined advantages, in the application and use of the novel legend sheet herein disclosed, another valuable feature resides in the instant invention in that the individual names and legends can be so applied as to conform to the outline and curvature of the various characters on the master copy.

Figure 8:
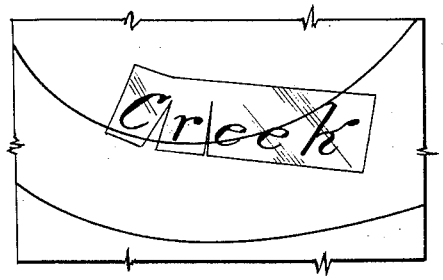
Figure 9:
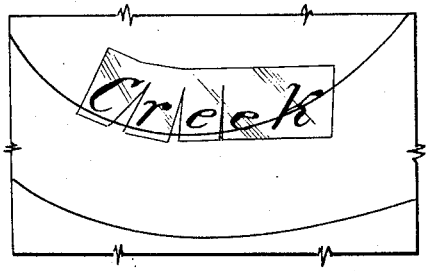
Figure 10:
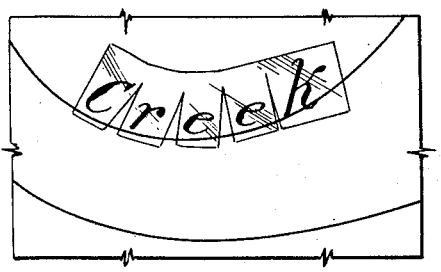
Figure 11:
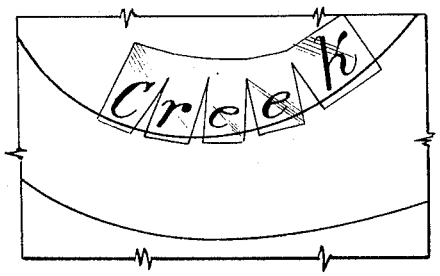

If it is desired to curve a name such as the name of a stream, to follow the curve of the stream, as indicated on the master copy of the map to be reproduced, the legend sheet with the name of the particular stream thereon is placed over the master copy and oriented in the same manner as described hereinbefore with respect to the contour line 10. Instead however, of pressing down the entire name, in this curving process, the first letter only in the name is rubbed down parallel to the curve of the stream at that point after which the entire name is cut out and the legend sheet removed. Assuming that a concave curve is to be made, a downward cut is made between the first and second letters, all but severing the first letter from the remaining letters in the word, but leaving a small connection at the top for pivoting, as shown in the enlarged Figure 7. The free end of the word-strip is then moved upward until the second letter is parallel to the curve of the stream, whereupon the second letter is burnished down, as illustrated in Figure 8. This procedure is repeated until the whole name is properly curved and affixed in place as clearly shown in Figures 9, 10 and 11.

If the name is to have a convex curve the cuts are made upwardly and the connecting links are left at the bottom of the lettering. S curves may also be made by curving part of the name one way and the remaining portion the other way, the cutting between the letters to be also reversed accordingly.

In curving the name to conform to a stream or the like, here again the transparency is of great importance, as it will allow the name to lie close to the stream line following its curve with great accuracy without blocking out any portion thereof.

Although the present invention has been illustrated and described in connection with the preparation of originals or master copies for the reproduction of maps and the like, it is of course to be understood the said invention is capable of many analogous uses and is to be limited only insofar as defined by the scope of the appended claims.

I claim:

1. A method of applying to an article or the like, a specific legend from a flexible, transparent, legend sheet containing a number of different legends provided on one side with a normally non-sticky adhesive wax, comprising the steps of first placing the sheet on the article to properly position the selected legend, affixing that part of the sheet only containing the selected legend by pressing the said adhesive wax surface in contact with said article, cutting around said selected legend to free it from the remaining part of the sheet and thereafter removing the sheet.

2. A method of applying to a master copy or the like a specific legend from a transparent legend sheet provided on one side with a number of printed legends and on the reverse side with a coating of normally non-sticky adhesive wax, comprising the steps of first placing the sheet on the master copy to properly position the selected legend, affixing that part of the sheet containing the selected legend by pressure applied only to that part of the sheet containing the selected legend, cutting around said selected legend to free the same from the remaining part of the sheet and thereafter removing the sheet.

3. A method of applying to an article or the like, a specific legend, word, or number from a transparent legend sheet provided on one side with a normally non-sticky adhesive wax, whereby said legend, word or number is caused to conform to the curvature of certain lines on said article, comprising the steps of first placing the sheet over the article to properly position the selected legend, word or number, then affixing that part of the sheet containing one end of said selected word or number by pressing the adhesive wax surface underlying that portion of said sheet in contact with the article, cutting around said entire word or number to free it from the remaining part of the sheet so that said sheet can be removed, next forming a series of spaced cuts along the word-strip, then moving the free end of said word strip to form the desired curve and finally pressing the serially cut portions of the word strip, in its curved formation, in contact with said article.

4. A method of applying to an article or the like, a specific legend, word or number from a transparent legend sheet provided on one side with a normally non-sticky adhesive wax, whereby said legend, word or number is caused to conform to the curvature of certain lines on said article, comprising the steps of first placing the sheet over the article to properly position the selected word, number or the like, then affixing that part of the sheet containing the first letter or numeral of said selected word or number by pressing the adhesive wax surface underlying said letter or numeral in contact with said article, cutting around said entire word or number to free it from the remaining part of the sheet so that said sheet can be removed, next forming a cut between the first and second letters of said word, moving the free end of said word-strip either up or down to follow the aforesaid curved line, thereafter pressing the second letter in contact with said article, next making a cut between the second and third letters of said word, again moving the remaining part of the word-strip to follow said curved line and continuing the aforesaid steps until the entire word or number is affixed to said article.

5. Means for selectively applying legends to articles and the like, comprising a permanently transparent sheet provided on one side with printed legends and on the reverse side with a dried coating of normally non-sticky adhesive wax.

6. Means for selectively applying by pressure legends to articles and the like, comprising a flexible, permanently transparent sheet, provided on one side with printed legends and on the reverse side with a dried coating of normally non-sticky adhesive wax.

7. A flexible, transparent sheet, for applying a specified legend to a master copy or the like, provided on one side with printed legends and on the reverse side with a dried coating of normally non-sticky adhesive wax, whereby any desired legend on said sheet may be affixed to the master copy by pressure applied only to that part of the sheet containing the selected legend.

8. A flexible, transparent sheet, for applying a specified legend to a master copy or the like, provided on one side with various printed legends and on the reverse side with a dried coating of normally non-sticky adhesive wax whereby the entire sheet may be oriented on the master copy to properly position the desired legend, said legend affixed thereto by pressure applied only to that part of the sheet containing the selected legend and the remaining part of the sheet removed after cutting around said selected legend.

9. A transparent sheet of cellulose xanthate, or similar permanently transparent material, for applying a specified legend to a master copy, provided on one side with printed legends and on the reverse side with a dried coating of normally non-sticky adhesive comprising white refined beeswax and latex rubber, said coating having adhesive qualities under pressure.

WILLIAM W. HEINTZ.